United States Patent [19]

Nakamura

[11] Patent Number: 5,359,623
[45] Date of Patent: Oct. 25, 1994

[54] MAGNETO-OPTICAL DISC CONTROL SYSTEM AND METHOD FOR AVOIDING THE NEED TO INITIALIZE AN ENTIRE SURFACE OF A STORAGE MEDIUM ON COMMENCEMENT OF USE

[75] Inventor: Kenichi Nakamura, Ota, Japan

[73] Assignee: Sanyo Electric Co., Ltd., Osaka, Japan

[21] Appl. No.: 967,779

[22] Filed: Oct. 28, 1992

[30] Foreign Application Priority Data

Oct. 29, 1991 [JP]  Japan .................................. 3-283234

[51] Int. Cl.$^5$ .............................................. G11B 17/22
[52] U.S. Cl. ...................................... 369/32; 369/44.27
[58] Field of Search ..................... 369/32, 44.27, 44.28, 369/44.25, 58, 30, 44.29, 44.31, 44.34, 44.39; 360/78.04, 78.14

[56] References Cited

U.S. PATENT DOCUMENTS 5,249,168  9/1993  Kagami et al. ................... 369/44.27

FOREIGN PATENT DOCUMENTS 0364176  4/1990  European Pat. Off. .
63-044366  2/1988  Japan .

Primary Examiner—Robert J. Pascal
Assistant Examiner—Ali Neyzari
Attorney, Agent, or Firm—Spensley Horn Jubas & Lubitz

[57] ABSTRACT

A magneto-optical disc control system and method, capable of applying conventional programs directly without requiring an initialization of the whole surface of a recording medium. When a readout request of data out of the magneto-optical disc device is given from a task program via an OS, a magneto-optical disc driver outputs a readout command to the magneto-optical disc device. When returning a blank check status from the magneto-optical disc device, the magneto-optical disc driver gives a notice for representing that a normal readout is performed to the OS, sets a specific initial value for the system into a buffer designated by the task program, and writes the initial value into a readout block on the recording medium. The OS gives a notice representing that the normal readout is performed to the task program, and the task program processes the data stored in the designated buffer as the readout data of the recording medium of the magneto-optical disc device.

8 Claims, 3 Drawing Sheets

MAGNETO-OPTICAL DISC CONTROL SYSTEM AND METHOD FOR AVOIDING THE NEED TO INITIALIZE AN ENTIRE SURFACE OF A STORAGE MEDIUM ON COMMENCEMENT OF USE

BACKGROUND OF THE INVENTION i) Field of the Invention

The present invention relates to a magneto-optical disc control system and method for effectively handling blank check state blocks on a medium.

ii) Description of the Related Arts

Recently, attention has fallen on the use of a magneto-optical disc device as a new memory suitable for a highly computerized environment. This magneto-optical disc device has well-known characteristic features, for instance, a magnetic film as a recording medium is used and an optical head having a laser light as a light source is used as a recording head. Also, a non-contact high density recording can be performed and, since the recording medium is composed of the magnetic film, the recording information is erasable and can be repeatedly recorded.

In turn, as other magnetic recording media, a floppy disc or a hard disc are used, and usually these media are distributed after certain check data are written in. However, in case of the magneto-optical disc device, only erase processing is carried out and data writing is not performed before distributing. Hence, almost all areas are in undetermined states (not "O" nor "1" state). This area where data has never been written is hereinafter referred to as "a blank check state block".

Accordingly, when a user uses these devices in a DOS (disk operating system) such as MS-DOS or the like, it is necessary to perform initialization by using a prepared initializing program to write a value such as "0" on the entire surface. However, since the magneto-optical disc device has a large capacity, it takes a long time such as 40 to 60 minutes for the initialization, which imposes a large load on the user. Further, with the capacity increase of the medium, the initialization time is inclined to increase, and thus it is considered that this will brings about an even bigger problem in the future.

The reason why the initialization is required will now be described.

In general, when use of a new recording medium is started, a usual operation is carried out as follows. That is, certain data are written at an initial time and then the written data are read out. However, depending on application programs (task programs), it may not be possible to perform a reading operation at the initial time, and in such a case, a measure should be considered.

Before the appearance of the magneto-optical disc device, floppy disc and hard disc were used as the storage medium. However, in the DOS for performing the control and operation of these devices or the user's application program, the program is designed on the supposition that "0" can be read out of the position accessed for reading at the initial time. When the value other than "0" is read out, since only a normal or abnormal message can be returned from the device, an error is adapted to be displayed regardless of its cause. Hence, even when the blank check state block is accessed for reading at the initial time by using the DOS or the application program, the error arises. Accordingly, conventionally, the initialization is required prior to the use of the device.

Further, another method can be considered, for example, the DOS or the application program is changed to another system which does not expect "0". However, the system expecting "0" as the value in the position firstly accessed for reading has been used for the almost all floppy discs and hard discs for a long time and this is the system giving actual results from a historical point of view. Hence, to change this system for the magneto-optical disc system is not realistic from a view point of compatibility.

As a result, when the conventional application program is used as it is, the initialization of the magneto-optical disc device must be always carried out, and thus it takes a long time for this operation before the user can actually utilize the device.

SUMMARY OF THE INVENTION

It is therefore an object of the present invention to provide a magneto-optical disc control system and method, in view of the aforementioned problems of the prior art, which is capable of eliminating an initialization of an entire surface of a medium on commencement of a use of a new magneto-optical disc device and applying conventional application programs as they are.

In accordance with one aspect of the present invention, there is provided a magneto-optical disc control system comprising a magneto-optical disc device for driving a read/write magneto-optical recording medium; disc control means for controlling the read/write of the magneto-optical disc device; upper control means for controlling various requests against the disc control means; and buffer memory means for storing data read out of the magneto-optical disc device by the disc control means, wherein the upper control means issues a request for data readout from the magneto-optical recording medium of the magneto-optical disc device to the disc control means, the disc control means outputs a readout command for reading out data of the data readout request to the magneto-optical disc device in response to the data readout request of the upper control means, the magneto-optical disc device performs a check of a state of a readout block specified by the readout command on the magneto-optical recording medium in response to the readout command, and returns a blank check status to the disc control means when the readout block is a blank check state representing a blank block where writing has never been carried out, the disc control means gives a notice representing that a normal readout is performed to the upper control means when receiving the blank check status from the magneto-optical disc device, and writes a specific initial value for the magneto-optical disc control system into the buffer memory means.

In a magneto-optical disc control system according to the present invention, when the upper control means reads data out of a blank check status block, the disc control means gives a notice for representing that a readout result is normal to the upper control means and writes the specific initial value into the designated buffer.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENT

Figure 1:
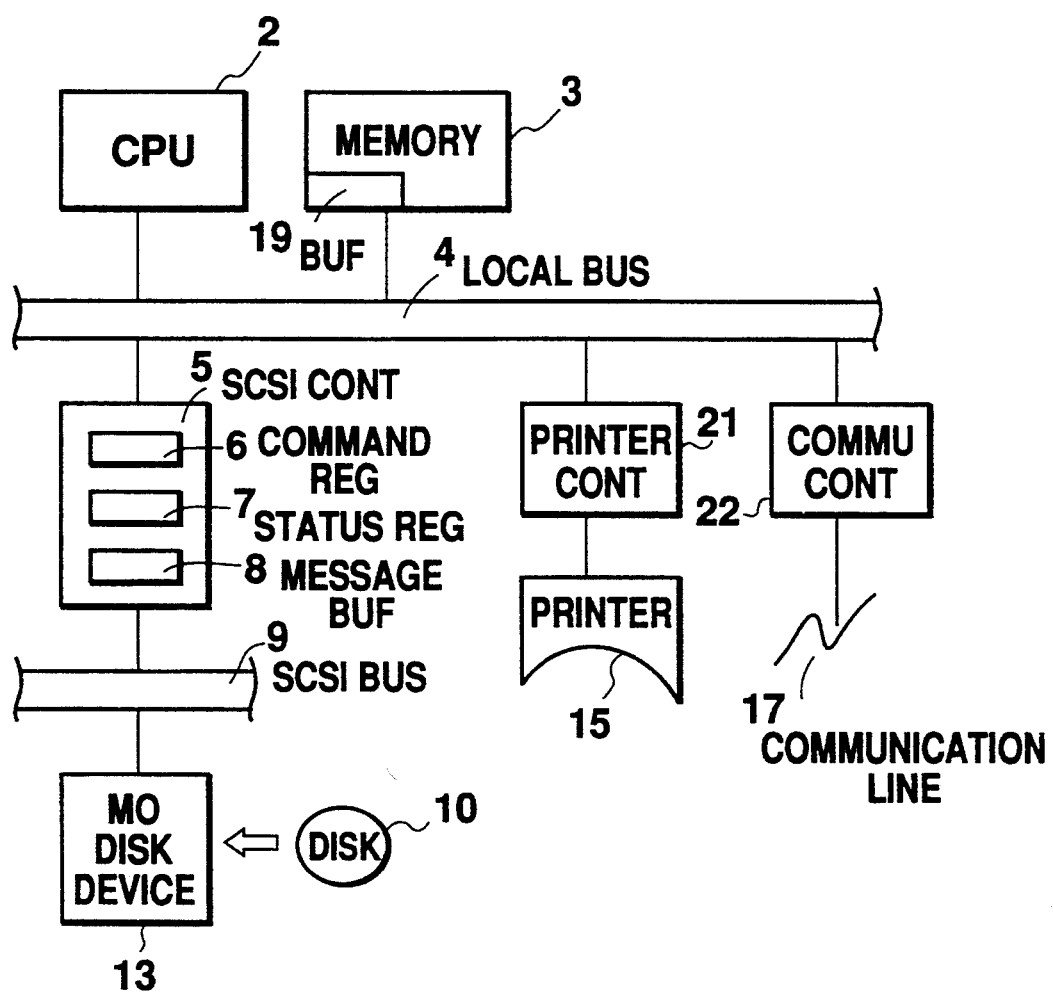
FIG. 1 is a block diagram of a magneto-optical disc control system according to the present invention.
Figure 2:
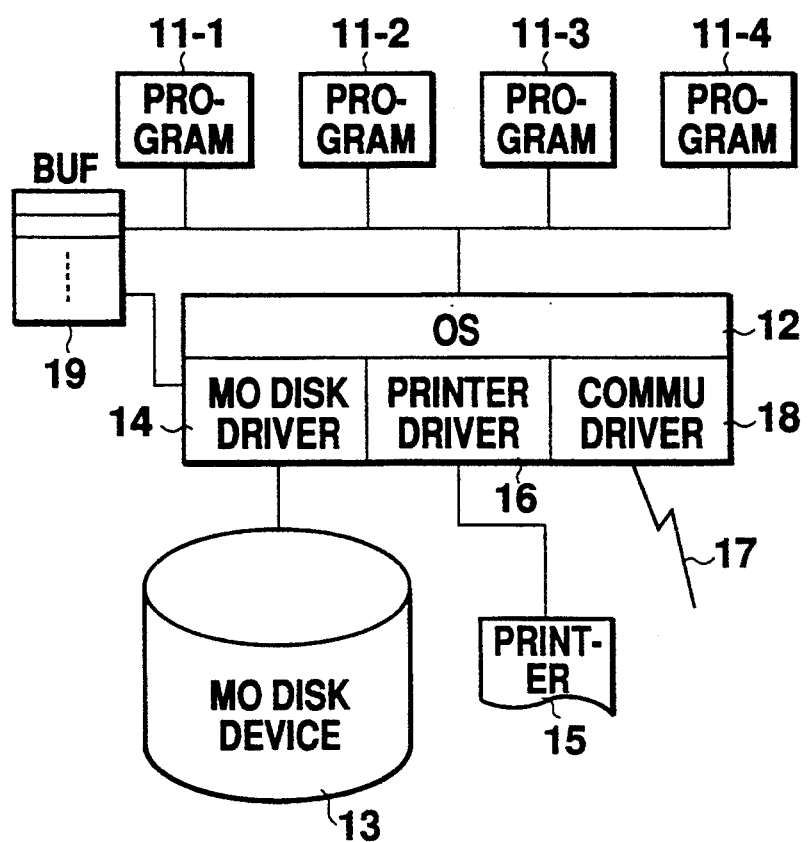
FIG. 2 is a block diagram of a functional structure of the system shown in FIG. 1.

Referring now to the drawings, wherein like reference characters designate like or corresponding parts throughout the views and thus the repeated description thereof can be omitted for brevity, there is shown in FIGS. 1 and 2 one embodiment of a magneto-optical disc control system according to the present invention.

As shown in FIG. 1, in the magneto-optical disc control system, a CPU (central processing unit) 2 for performing a control of the operation of the whole system is connected with a memory 3 and various controllers such as an SCSI (small computer system interface) controller 5, a printer controller 21, a communication controller 22 and the like via a local bus 4.

The memory 3 stores various control programs and possesses a buffer memory 19 for temporarily storing the data communicated among the aforementioned connected devices. The SCSI controller 5 controls the data transfer between a SCSI bus 9 and the local bus 4 and includes a command register 6 for setting commands for a magneto-optical disc device 13, a status register 7 for setting various states and various messages output from the magneto-optical disc device 13, and a message buffer 8. A magneto-optical recording medium or disk (hereinafter referred to as "disc") 10 is inserted into the magneto-optical disc device 13, and the magneto-optical disc device 13 performs the reading and writing of the data from and into the disc 10. In this case, it is assumed that only a necessary minimum control program is written within the disc 10 and a physical initialization over the entire surface of the disc 10 is not carried out. The printer controller 21 and the communication controller 22 control a printer 15 and a communication line 17, respectively.

FIG. 2 shows a functional structure of the system shown in FIG. 1. In FIG. 2, an OS (operating system) 12 is a basic program which is loaded into the memory 3 from an external memory device (not shown) at a system start time and is resident therein for controlling the whole system, and under this OS 12, control programs such as a magneto-optical disc driver 14 for controlling the magneto-optical disc device 13, a printer driver 16 for controlling the printer 15 and a communication line driver 18 for controlling the communication line 17 are placed.

In this embodiment, four application programs 11-1, 11-2, 11-3 and 11-4 are provided so as to perform predetermined task processings under the OS 12.

Figure 3:
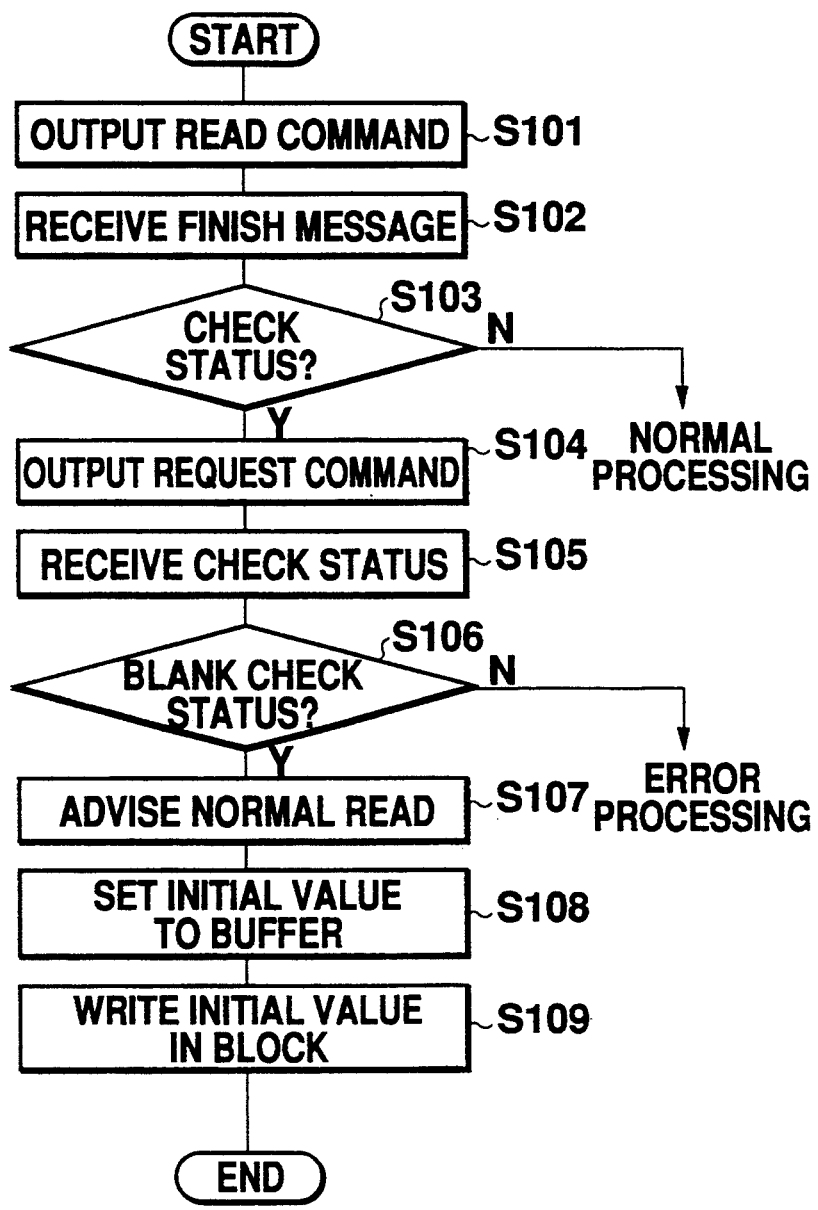
FIG. 3 is a flow chart showing a process executed by a magneto-optical disc driver shown in FIG. 2.

Next, the operation of the above-described magneto-optical disc control system will be described in connection with FIG. 3. FIG. 3 shows a processing flow of the magneto-optical disc driver 14. First, when a request for a data readout is given against the magneto-optical disc device 13 from any application program (for example, the application program 11-1) or the OS 12, the magneto-optical disc driver 14 outputs a readout command to the magneto-optical disc device 13 in step S101. More specifically, this processing is executed as follows. That is, the CPU 2 writes the readout command into the command register 6 of the SCSI controller 5, and the written readout command is transferred to the magneto-optical disc device 13. This readout command includes a readout block on the disc 10 of the magneto-optical disc device 13 and a designation of a readout buffer (buffer memory 19) for writing in the readout data.

The readout command set in the command register 6 of the SCSI controller 5 is transferred to the magneto-optical disc device 13 via the SCSI bus 9. After executing the readout of the data against the specified block, the magneto-optical disc device 13 returns a finish message to the magneto-optical disc driver 14 in step S102. More specifically, this processing is carried out by writing the finish message into the message buffer 8 of the SCSI controller 5. The finish message is either a good status message, representing the fact that the readout was normally performed or a check status message for representing the fact that the readout was not normally executed and a certain check is required. When the finish message is the good status message (N in step S103), the normal processing is carried out.

On the other hand, when the finish message is the check status message (Y in step S103), the magneto-optical disc driver 14 outputs a request command for further inquiring the content of the check status in step S104. More specifically, this processing is carried out as follows. That is, the CPU 2 writes the request command into the command register 6 of the SCSI controller 5 and the written request command is transferred to the magneto-optical disc device 13. In response to the request command, the magneto-optical disc device 13 returns a certain check status against the magneto-optical disc driver 14 in step S105. More specifically, this processing is executed as follows. That is, the check status is written into the status register 7 of the SCSI controller 5, and the CPU 2 reads out the written check status.

In this case, since the physical initialization of the disc 10 is not performed, as described above, the magneto-optical disc device 13 returns a blank check status for representing the block where the writing has never been performed to the magneto-optical disc driver 14 (Y in step S106). In response to the blank check status, the magneto-optical disc driver 14 generates a message for representing the fact that the writing was normally performed to the OS 12 in step S107 and also sets a specific initial value for the system in the buffer memory 19 of the memory 3 in step S108. Also, the magneto-optical disc driver 14 gives an instruction to the magneto-optical disc device 13 so as to write this initial value into a proper block, that is, the readout block on the disc 10. More specifically, this processing is performed by writing an initial value write command into the command register 6 of the SCSI controller 5 by means of the CPU 2. By this operation, the initial value can be initially written in the readout block on the disc 10 in step S109. In this case, the specific initial value for the system means an expected value to be read out of the block accessed by the system for reading out, for instance, a value of "0" or the like can be used.

Then, when the OS 12 receives a message representing the fact that the readout can be normally carried out, the OS 12 reports the fact that the readout result is normal to the application program 11-1. Upon receiving this message, the application program 11-1 processes the content ("0") of the buffer memory 19 or, the memory 3 as the readout data of the magneto-optical disc device 13.

On the other hand, in step S106, when the status returned from the magneto-optical disc device 13 in response to the request command is a status other than the blank check status, for example, in the case of a readout failure, a status representing the fact that the readout has actually failed, a parity error status representing the fact that a parity error was caused, or the like, the magneto-optical disc driver 14 transfers this status to the OS 12 as it is. Upon receiving this status, the OS 12 discriminates that an error has actually occurred and executes predetermined error processing.

As described above, when the block accessed for reading on the disc 10 is a blank check status block, that is, a non-initialized block, the magneto-optical disc driver 14 gives a report representing the fact that the normal readout can be carried out to the OS 12 and sets the specific initial value for the system in the readout buffer. As a result, the error can be avoided.

As described above, according to the present invention, even when a readout access to a non-initialized block on a magneto-optical recording medium or disc is carried out, no error is caused, and thus physical initialization processing required on commencement of use of a new medium the conventional system can be omitted. Therefore, a user can be released from the troublesome operation of the initialization requiring a long time, and a throughput of the operation can be remarkably improved.

Although the present invention has been described in its preferred embodiment with reference to the accompanying drawings, it readily understood that the present invention is not restricted to the preferred embodiment and that various changes and modifications can be made by those skilled in the art without departing from the spirit and scope of the present invention.

What is claimed is:

1. A magneto-optical disc control system, comprising:
   a magneto-optical disc device for driving a read/write magneto-optical recording medium;
   disc control means for controlling the read/write of the magneto-optical disc device;
   upper control means for controlling various requests against the disc control means; and
   buffer memory means for storing data read out of the magneto-optical disc device by the disc control means,
   the upper control means issuing a request for data readout from the magneto-optical recording medium of the magneto-optical disc device to the disc control means,
   the disc control means outputting a readout command for reading out data of the data readout request to the magneto-optical disc device in response to the data readout request of the upper control means,
   the magneto-optical disc device performing a check of a state of a readout block specified by the readout command on the magneto-optical recording medium in response to the readout command, and returning a blank check status to the disc control means when the readout block is a blank check state representing a blank block where writing has never been carried out,
   the disc control means giving a notice representing that a normal readout is performed to the upper control means when receiving the blank check status from the magneto-optical disc device, and writing a specific initial value for the magneto-optical disc control system into the buffer memory means.

2. The system of claim 1, wherein the disc control means gives a notice representing that the normal readout is performed to the upper control means when receiving the blank check status from the magneto-optical disc device, writing the specific initial value into the buffer memory means and the readout block on the magneto-optical recording medium of the magneto-optical disc device.

3. The system of claim 1, wherein the specific initial value to be written into the buffer memory means is a value to be written into the magneto-optical recording medium at an initialization time of the magneto-optical recording medium.

4. The system of claim 1, wherein, when receiving a good status representing that the normal readout is performed from the magneto-optical disc device, the disc control means writes readout data sent along with the good status into the buffer memory means.

5. The system of claim 4, wherein, when receiving another status other than the blank check status and the good status from the magneto-optical disc device, the disc control means transfers said another status to the upper control means, and, when receiving said another status from the disc control means, the upper control means discriminates this as a readout error and performs predetermined error processing.

6. The system of claim 4, wherein the upper control means reads the data out of the buffer memory means and processes the readout data as data read out of the magneto-optical recording medium of the magneto-optical disc device in response to a request of the upper control means.

7. The system of claim 5, wherein said another status is either a readout failure status representing that the readout is actually failed or a parity error status representing that a parity error is generated.

8. A method of controlling a magnetic-optical disc system, which system is composed of a magneto-optical disc device for driving a read/write magneto-optical recording medium, disc control means for controlling the read/write of the magneto-optical disc device, upper control means for controlling various requests against the disc control means, and buffer memory means for storing data read out of the magneto-optical disc device by the disc control means, the method comprising the steps of:
   causing the upper control means to issue a data readout request to the disc control means to read data out from the magneto-optical recording medium of the magneto-optical disc device;
   in response to the data readout request from the upper control means, causing the disc control means to issue a readout command for permitting the magneto-optical disc device to read out data;
   in response to the readout command, causing the magneto-optical disc device to check a status of a readout block on the magneto-optical recording medium specified by the readout command;
   causing the magneto-optical disc device to return a blank check status signal to the disc control means when the readout block in question is found to be completely blank;
   in response to the blank check status signal, causing the disc control means to notify the upper control means that the readout is normally carried out; and
   writing an initial value peculiar to the magneto-optical disc control system into the buffer memory means.

* * * * *